United States Patent
Bi et al.

(10) Patent No.: US 6,941,265 B2
(45) Date of Patent: Sep. 6, 2005

(54) VOICE RECOGNITION SYSTEM METHOD AND APPARATUS

(75) Inventors: Ning Bi, San Diego, CA (US); Andrew DeJaco, San Diego, CA (US); Xin Zhong, San Diego, CA (US); Chienchung Chang, Rancho Santa Fe, CA (US); Chuck Han, San Diego, CA (US); Hari Garudadri, San Diego, CA (US); Naren Malayath, San Diego, CA (US); Suhail Jalil, Poway, CA (US)

(73) Assignee: Qualcomm Inc, San Diego, CA (US)

( * ) Notice: Subject to any disclaimer, the term of this patent is extended or adjusted under 35 U.S.C. 154(b) by 0 days.

(21) Appl. No.: 10/017,270

(22) Filed: Dec. 14, 2001

(65) Prior Publication Data
US 2003/0171924 A1 Sep. 11, 2003

(51) Int. Cl.⁷ .............................................. G10L 15/00
(52) U.S. Cl. ....................... 704/246; 704/270
(58) Field of Search .................. 704/200, 246, 704/251, 255, 270

(56) References Cited

U.S. PATENT DOCUMENTS 6,678,654 B2 * 1/2004 Zinser et al. ................ 704/221

FOREIGN PATENT DOCUMENTS

| GB | 2343778 A | * 5/2000 | ........... G10L/15/00 |
| GB | 2363236 A | * 12/2001 | ........... G10L/15/20 |
| WO | WO 00/58942 | * 10/2000 | ........... G10L/15/00 |
| WO | 0195312 | 12/2001 | |

* cited by examiner

*Primary Examiner*—Daniel Abebe
(74) *Attorney, Agent, or Firm*—Philip R Wadsworth; Charles D Brown; George C. Poppas

(57) ABSTRACT

Generally stated a method and an accompanying apparatus provides for a voice recognition system (300) with programmable front end processing unit (400). The front end processing unit (400) requests and receives different configuration files at different times for processing voice data in the voice recognition system (300). The configuration files are communicated to the front end unit via a communication link (310) for configuring the front end processing unit (400). A microprocessor may provide the front end configuration files on the communication link at different times.

23 Claims, 4 Drawing Sheets

VOICE RECOGNITION SECTIONS

VOICE RECOGNITION SECTIONS

VOICE RECOGNITION SYSTEM METHOD AND APPARATUS

BACKGROUND

I. Field of the Invention

The disclosed embodiments relate to the field of voice recognition, and more particularly, to voice recognition in a wireless communication system.

II. Background

Figure 1:
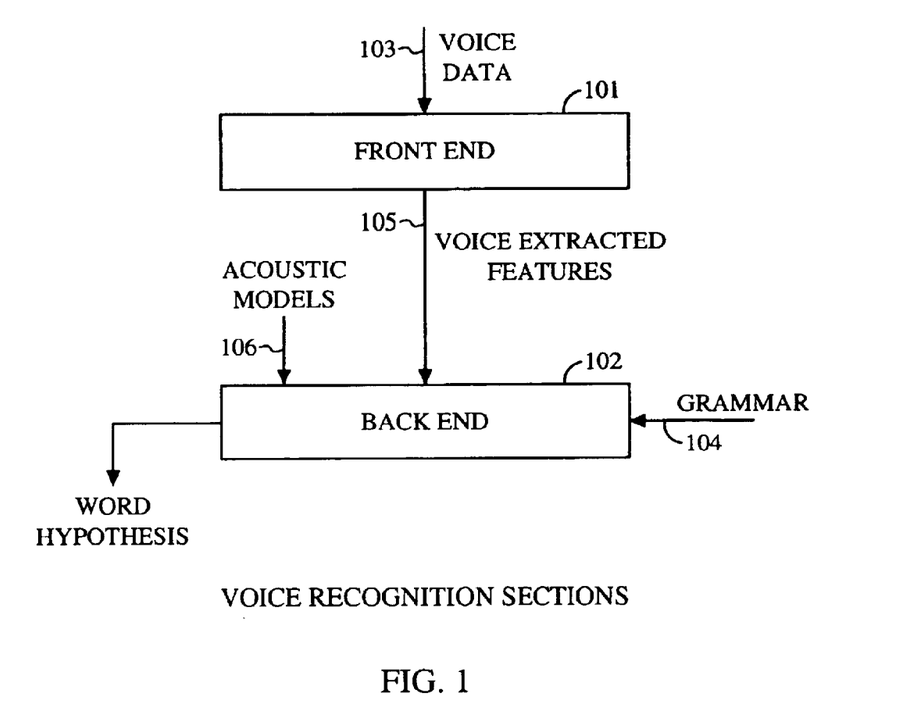
FIG. 1 illustrates partitioning of voice recognition functionality between two partitioned sections such as a front-end section and a back-end section.

Voice recognition (VR) technology, generally, is known and has been used in many different devices. Referring to FIG. 1, generally, the functionality of VR may be performed by two partitioned sections such as a front-end section 101 and a back-end section 102. An input 103 at front-end section 101 receives voice data. A microphone (not shown) may originally generate the voice data. The microphone through its associated hardware and software converts audible input voice information into voice data. Front-end section 101 examines the short-term spectral properties of the input voice data, and extracts certain front-end voice features, or front-end features, that are possibly recognizable by back-end section 102.

Back-end section 102 receives the extracted front-end features at an input 105, a set of grammar definitions at an input 104 and acoustic models at an input 106. Grammar input 104 provides information about a set of words and phrases in a format that may be used by back-end section 102 to create a set of hypotheses about recognition of one or more words. Acoustic models at input 106 provide information about certain acoustic models of the person speaking into the microphone. A training process normally creates the acoustic models. The user may have to speak several words or phrases for creating his or her acoustic models.

Generally, back-end section 102 compares the extracted front-end features with the information received at grammar input 104 to create a list of words with an associated probability. The associated probability indicates the probability that the input voice data contains a specific word. A controller (not shown), after receiving one or more hypotheses of words, selects one of the words, most likely the word with the highest associated probability, as the word contained in the input voice data. The system of back end 102 may reside in a microprocessor. Generally, different companies provide different back end systems based on their design. Therefore, the operation of front end 101 may also need to correspond to the operation of the back end 102 to provide an effective VR system. As a result, to provide a wide range of possible VR systems in accordance with a wide range of possible back end system designs, the front end system 101 may need to operate with a wide range of different back end designs. Therefore, it is desirable to have a front end VR system for operation in accordance with a wide range of back end designs.

SUMMARY

Generally stated, a method and an accompanying apparatus provides for a voice recognition system with programmable front end processing. A front end processing unit requests and receives different configuration files at different times for processing voice data in the voice recognition system. The configuration files are communicated to the front end processing unit via a communication link for configuring the front end processing unit. A microprocessor may provide the front end configuration files on the communication link at different times. The communication via the communication link may be in accordance with a wireless communication. The front end processing unit may be a digital signal processor. The front end processing unit inputs and programs different configuration files at different times. The microprocessor may be hosted in a communication network.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION OF THE PREFERRED EMBODIMENT

Generally stated, a novel and improved method and apparatus provide for a programmable front end voice recognition (VR) capability in a remote device. The programmable front end may be configured to perform the front end functions of the VR system for a wide range of back end designs. The exemplary embodiment described herein is set forth in the context of a digital communication system. While use within this context is advantageous, different embodiments of the invention may be incorporated in different environments or configurations. In general, various systems described herein may be formed using software-controlled processors, integrated circuits, or discrete logic. The data, instructions, commands, information, signals, symbols, and chips that may be referenced throughout are advantageously represented by voltages, currents, electromagnetic waves, magnetic fields or particles, optical fields or particles, or a combination thereof. In addition, the blocks shown in each block diagram may represent hardware or method steps.

The remote device in the communication system may decide and control the portions of the VR processing that may take place at the remote device and the portions that may take place at a base station in wireless communication with the remote device. The portion of the VR processing taking place at the base station may be routed to a VR server connected to the base station. The remote device may be a cellular phone, a personal digital assistant (PDA) device, or any other device capable of having a wireless communication with a base station. The remote device may establish a wireless connection for communication of data between the remote device and the base station. The base station may be connected to a network. The remote device may have incorporated a commonly known micro-browser for browsing the Internet to receive or transmit data. In accordance with various aspects of the invention, the wireless connection may be used to receive front end configuration data. The front end configuration data corresponds to the type and design of the back end portion. The front end configuration data is used to configure the front portion to operate correspondingly with the back end portion. In accordance with various embodiments, the remote device may request for the configuration data, and receive the configuration data in response.

The remote device performs a VR front-end processing on the received voice data to produce extracted voice features of the received voice data in accordance with a configuration corresponding to the design of the back end portion. There are many possible back end designs. The remote device may detect the type of the back end function and create a configuration file for configuring the front end portion. The remote device through its microphone receives the user voice data. The microphone coupled to the remote device takes the user input voice, and converts the input into voice data. After receiving the voice data, and after configuring the front end portion, certain voice features in accordance with the configuration are extracted. The extracted features are passed on to the back end portion for VR processing.

For example, the user voice data may include a command to find the weather condition in a known city, such as Boston. The display on the remote device through its microbrowser may show "Stock Quotes|Weather|Restaurants|Digit Dialing|Nametag Dialing|Edit Phonebook" as the available choices. The user interface logic in accordance with the content of the web browser allows the user to speak the key word "Weather", or the user can highlight the choice "Weather" on the display by pressing a key. The remote device may be monitoring for user voice data and the keypad input data for commands to determine that the user has chosen "weather." Once the device determines that the weather has been selected, it then prompts the user on the screen by showing "Which city?" or speaks "Which city?". The user then responds by speaking or using keypad entry. If the user speaks "Boston, Mass.", the remote device passes the user voice data to the VR processing section to interpret the input correctly as a name of a city. In return, the remote device connects the microbrowser to a weather server on the Internet. The remote device downloads the weather information onto the device, and displays the information on a screen of the device or returns the information via audible tones through the speaker of the remote device. To speak the weather condition, the remote device may use text-to-speech generation processing. The back end processings of the VR system may take place at the device or at VR server connected to the network.

Figure 2:
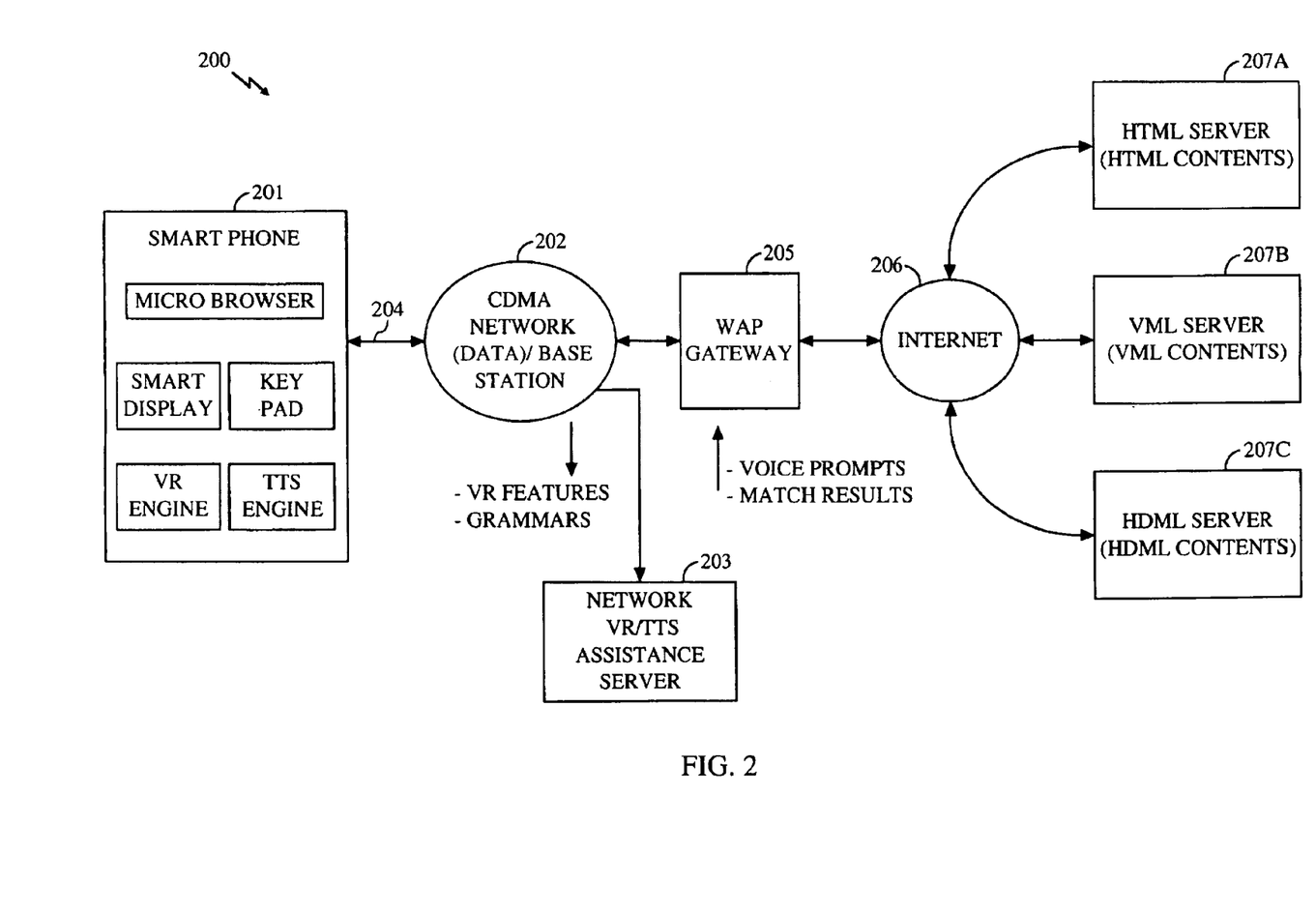
FIG. 2 depicts a block diagram of a communication system incorporating various aspects of the disclosed embodiments.

In one or more instances, the remote device may have the capacity to perform a portion of the back-end processing. The back end processing may also reside entirely on the remote device. Various aspects of the disclosed embodiments may be more apparent by referring to FIG. 2. FIG. 2 depicts a block diagram of a communication system 200. Communication system 200 may include many different remote devices, even though one remote device 201 is shown. Remote device 201 may be a cellular phone, a laptop computer, a PDA, etc. The communication system 200 may also have many base stations connected in a configuration to provide communication services to a large number of remote devices over a wide geographical area. At least one of the base stations, shown as base station 202, is adapted for wireless communication with the remote devices including remote device 201. A wireless communication link 204 is provided for communicating with the remote device 201. A wireless access protocol gateway 205 is in communication with base station 202 for directly receiving and transmitting content data to base station 202. The gateway 205 may, in the alternative, use other protocols that accomplish the same or similar functions. A file or a set of files may specify the visual display, speaker audio output, allowed keypad entries and allowed spoken commands (as a grammar). Based on the keypad entries and spoken commands, the remote device displays appropriate output and generates appropriate audio output. The content may be written in markup language commonly known as XML HTML or other variants. The content may drive an application on the remote device. In wireless web services, the content may be up-loaded or down-loaded onto the device, when the user accesses a web site with the appropriate Internet address. A network commonly known as Internet 206 provides a land-based link to a number of different servers 207A–C for communicating the content data. The wireless communication link 204 is used to communicate the data to the remote device 201.

In addition, in accordance with an embodiment, a network VR server 206 in communication with base station 202 directly may receive and transmit data exclusively related to VR processing. Server 206 may perform the back-end VR processing as requested by remote station 201. Server 206 may be a dedicated server to perform back-end VR processing. An application program user interface (API) provides an easy mechanism to enable applications for VR running on the remote device. Allowing back-end processing at the sever 206 as controlled by remote device 201 extends the capabilities of the VR API for being accurate, and performing complex grammars, larger vocabularies, and wide dialog functions. This may be accomplished by utilizing the technology and resources on the network as described in various embodiments.

A correction to a result of back end VR processing performed at VR server 206 may be performed by the remote device, and communicated quickly to advance the application of the content data. If the network, in the case of the cited example, returns "Bombay" as the selected city, the user may make correction by repeating the word "Boston." The back end processing in the next iteration may take place on the remote device without the help of the network. In other situations, the back end processing may be performed entirely on the remote device. For example, some commands (such as spoken command "STOP" or keypad entry "END") may have their back end processing performed on the remote device. In this case, there is no need to use the network for the back end VR processing, therefore, the remote device performs the front end and back end VR processings. As a result, the front end and back end VR processings at various times during a session may be performed at a common location or distributed.

Figure 3:
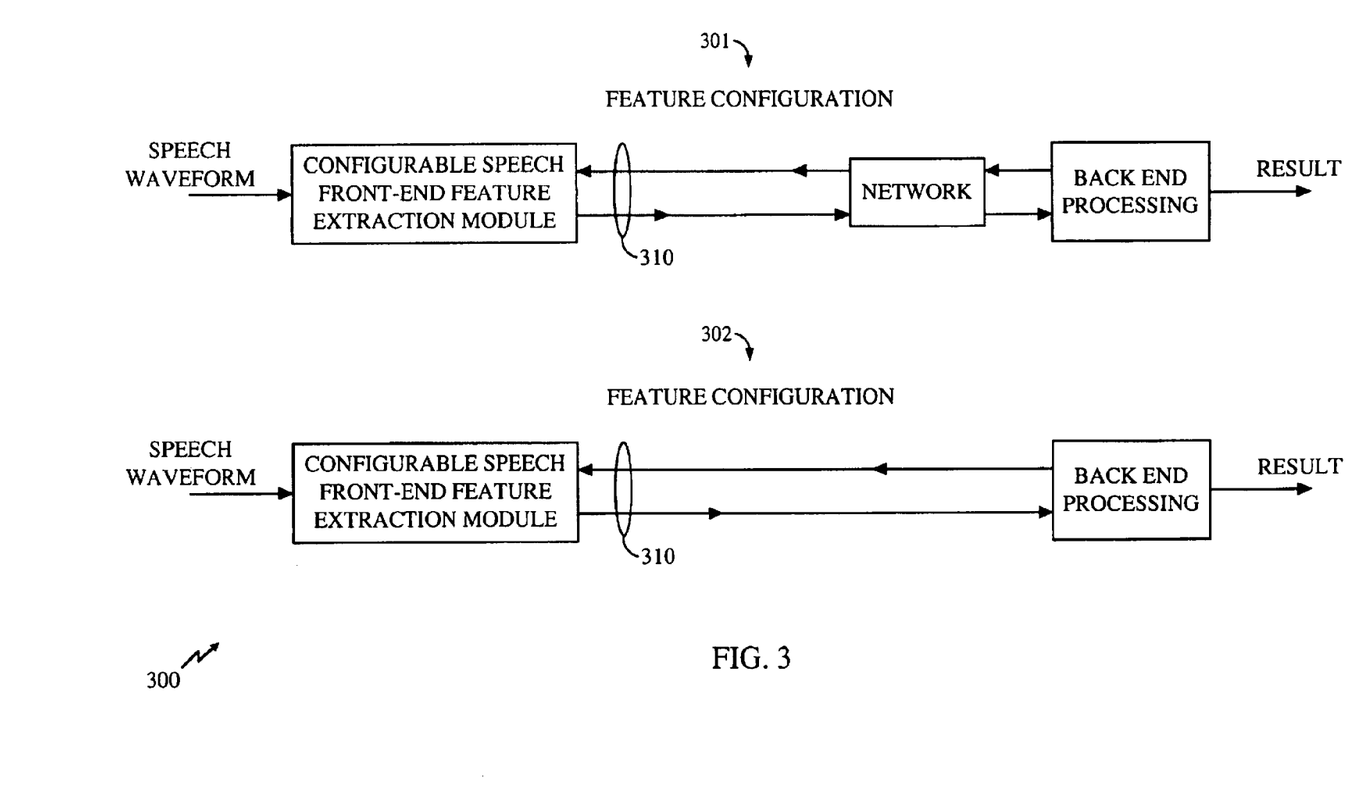
FIG. 3 illustrates partitioning of a voice recognition system in accordance with a co-located voice recognition system and a distributed voice recognition system.

Referring to FIG. 3, a general flow of information between various functional blocks of a VR system 300 is shown. A distributed flow 301 may be used for the VR processing when the back end processing and front end processings are distributed. A co-located flow 302 may be used when the back end and front end processings are co-located. In the distributed flow 301, the front end may obtain a configuration file from the network. The content of the configuration file allows the front end to configure various internal functioning blocks to perform the front end feature extraction in accordance with the design of the back end processing. The co-located flow 302 may be used for obtaining the configuration file directly from the back end processing block. The communication link 310 may be used for making a request and receiving the configuration file. The co-located flow 302 and distributed flow 301 may be used by the same device at different times during a VR processing session.

Figure 4:
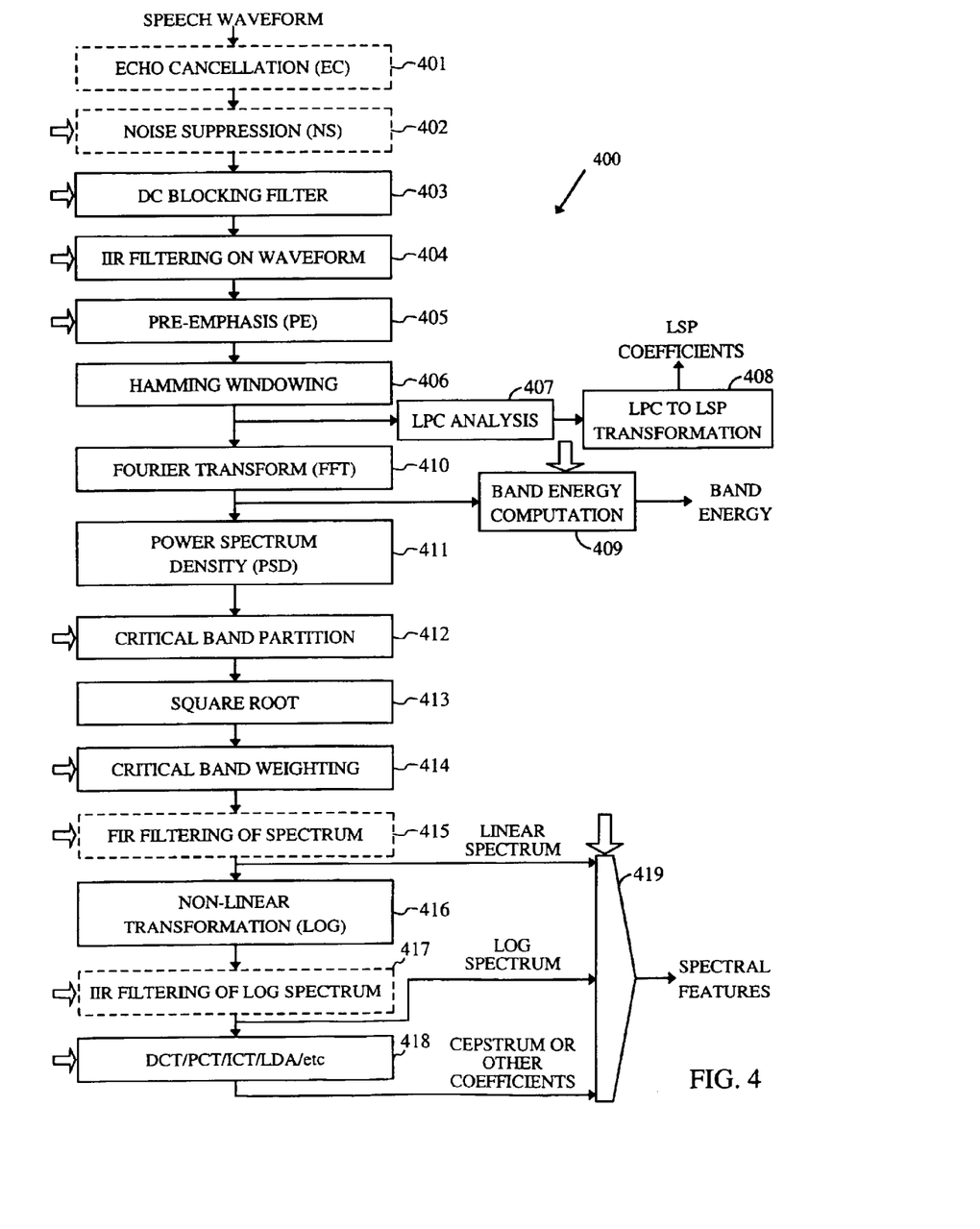
FIG. 4 illustrates a front end voice processing block diagram for operation in accordance with different back end processing types and designs.

Referring to FIG. 4, a general block diagram of a digital signal processor (DSP) 400 for performing the front end processing in a VR system is shown. The front end processing is performed to extract voice features of the input speech. The extracted voice features are provided to the back end processing to complete the VR processing. The extracted voice features include different information. For example, the extracted features may include any combinations of line spectral pair (LSP) coefficients, band energy and at least one of the spectral features such as linear spectrum, Cepstrum. The front end DSP 400 may have many different blocks. The blocks may have adjustable parameters. The configuration file that programs the front end DSP 400 includes information about which block is being used and what parameters are used for operation of the blocks. For example, echo cancellation block 401, noise suppression block 402, FIR filtering of spectrum block 415 and IIR filtering of log spectrum block 417 may or may not, individually or in any possible combination, be included in the front end DSP 400. The parameters of different blocks may be adjustable in the following blocks: the noise suppression block 402, DC blocking filter block 403, IIR filtering on waveform block 404, pre-emphasis block 405, band energy computation block 409, critical band partition block 412, critical band weighting block 414, FIR filtering of spectrum block 415, IIR filtering of log spectrum block 417, DCT/PCT/ICT/LDA block 418 and combining block 419.

In an exemplary embodiment, all the blocks shown for front end DSP 400 may be included. In such an embodiment, speech waveforms are input to echo cancellation block 401. The operation and use of various echo cancellers are known by one ordinary skilled in the art. The noise suppression block 402 attenuates the noise in the received signal. The attenuation parameter may be adjustable. The DC blocking filter 403 blocks the DC components of the received signal. The operation of the DC blocking filter may be in accordance with the following relationship:

$$\frac{1-z^{-1}}{1-az^{-1}},$$

where the denominator parameter is adjustable. The IIR filtering on waveform block 404 may filter the waveform in accordance with the relationship:

$$\frac{\sum_{i=0}^{L} b_i z^{-i}}{1+\sum_{i=1}^{L} a_i z^{-i}},$$

where all the parameters in the relationship are adjustable. The pre-emphasis block 405 performs the pre-emphasis filleting in accordance with the relationship: $1-bz^{-1}$, where the relationship includes adjustable parameters. The hamming windowing block 406 filters the results in accordance with the commonly known Hamming process. The linear spectrum (LPC) analysis block 405 performs the LPC analysis. The LPC to line spectral pair (LSP) transformation block 408 outputs the LSP coefficients for further VR processing at the back end.

The Fourier transform (FFT) block 410 performs the Fourier analysis on the received signal. The output is passed on to the band energy computation block 409. The band energy computational block 409 detects by partitioning the frequency spectrum into different frequency bands and calculating signal energy in each frequency band. The partitioned frequency bands associated with the detection of the end points may be adjustable. The output of block 409 is the band energy. The output of FFT block 410 is also passed on to the power spectrum density block 411. The critical band partition block 412 partitions the frequency band. The center frequency of the partitioned band may be adjustable. The block 413 performs the square root function on the result. The critical band weighting block 414 assigns different weights to different frequency bands. The weights may be adjustable. The FIR filtering of spectrum block 415 performs the FIR filtering on linear spectrum with an adjustable frequency response, such as:

$$\sum_{i=0}^{I} c_i z^{-i}.$$

The output is the linear spectrum. The non-linear transformation block 416 performs the linear to log spectrum transformation. The IIR filtering of log spectrum block performs the filtering in accordance with the following relationship:

$$\frac{\sum_{i=0}^{K} d_i z^{-i}}{1+\sum_{i=1}^{K} e_i z^{-i}}.$$

The output is the log spectrum. The DCT/PCT/ICT/LDA block 418 performs discrete cosine transform (DCT), principal components transform (PCT), independent component transform (ICT), linear discriminate analysis (LDA), or other transformations. The Cepstrum or other coefficients are produced. The block 419 selects, in accordance with the configuration, at least one of the linear spectrum, log spectrum and the Cepstrum or other coefficients to produce the spectral features. The spectral features, band energy and LSP coefficients are outputted for further VR processing by the back end.

Different back end design may require different set of information from the frond end processing. In accordance with the various embodiments of the invention, the front end portion may operate to provide different information corresponding to the design and requirements of the back end processing. For example, the configuration file for two different configurations may be in accordance with the following:

First Configuration
EC 401: by pass.
NS 402: by pass.
DC blocking filter 403: set a=0.95.
IIR filtering on speech waveform 404: by pass.
PE 405: set b=0.97.
FFT 410: 256-point FFT.
PSD 411: real*real+imag*imag.
Critical band partition 412: Mel-scale frequency triangle function. Set number of band=19. Set center frequency of each band; melCenFreq[i]={220, 310, 400, 490, 580, 670, 760, 850, 940, 1030, 1130, 1260, 1400, 1600, 1850, 2150, 2500, 2900, 3400} (Hz).
FIR filtering on spectrum 415: by pass.
Non-linear transformation 416: Log10.
IIR filtering of Log spectrum 417: by pass.
DCT/PCT/ICT/LDA/etc 418.: perform DCT.

Output of block 419: Mel-frequency cepstrum coefficients.
Second Configuration
EC 401: by pass.
NS 402: included.
DC blocking filter 403: set a=0.97.
IIR filtering on speech waveform 404: by pass.
PE 405: set b=0.97.
FFT 410: 256-point FFT.
PSD 411: real*real+imag*imag.
Critical band partition 412: Mel-scale frequency triangle function. Set number of band=16. Set center frequency of each band melCenFreq[i]={250, 350, 450, 550, 650, 750, 850, 1000, 1170, 1370, 1600, 1850, 2150, 2500, 2900, 3400} (Hz).
FIR filtering on spectrum 415: b[i]={0.25, 0.5, 0.25}.
Non-linear transformation 416: ln, natural logarithm.
IIR filtering of Log spectrum 417: RASTA filter.
DCT/PCT/ICT/LDA/etc 418.: DCT.
Output of block 419: Mel-frequency cepstrum coefficients with RASTA filtering.

The communication link 310 may be used to communicate the first and second configurations to the front end DSP 400. A change in configuration may take place at any time. The remote device may perform the front end processing in accordance with one configuration at one time and in accordance with another configuration at another time. As such, the remote device is capable of performing the front end processing for a wide variety of back end designs. For example, the remote device may be used in accordance with a hands free operation in a car. In this case, the back end processing in the car may require certain unique front end processing. After detecting that the remote device is being used in such an environment, the configuration file is loaded in the front end DSP 400. While a communication is maintained, the remote device may be removed from the car, as the person using the remote device begins to leave the car environment. At this time, once the new environment is detected, a new configuration file may be loaded in the front end DSP 400. The remote unit or the network may keep track of the configuration file loaded in the front end. After the network or the remote device detects the need for a new configuration file, the new configuration file is requested and sent to the front end DSP unit 400. The front end DSP unit 400 receives the new configuration file, and programs the new configuration file to operate in accordance with the new configuration file.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty.

What is claimed is:

1. A method comprising:
configuring a front end voice processor to one of a plurality of configurations, each configuration governing a processing of voice features in accordance with at least one back end voice processor design for recognizing speech based on the voice features.

2. A method in accordance with claim 1, wherein the configuring comprises configuring the front end voice processor in accordance with a configuration file.

3. A method in accordance with claim 2, further comprising:
receiving the configuration file through a communication link.

4. A method in accordance with claim 3, wherein the communication link is a wireless communication link.

5. A method in accordance with claim 2, further comprising:
determining a current back end design of a back end voice processor in communication with the front end voice processor; and
generating the configuration file corresponding to the current back end design.

6. A method in accordance with claim 2, wherein the configuring comprises:
adjusting at least one adjustable parameter of at least one block of a plurality of blocks comprising the front end voice processor.

7. A method in accordance with claim 6, wherein the at least one block is selected from the group consisting of:
a DC blocking filter block, a noise suppression block, a FIR filtering on waveform block, a pre-emphasis block, a band energy computation block, a critical band partition block, a critical band weighting block, a FIR filtering of spectrum block, an IIR filtering of log spectrum block, a DCT/PCT/ICT/LDA block, and a combining block.

8. A method in accordance with claim 1, wherein the configuring comprises programming a digital signal processor (DSP) to perform functions of the front end voice processor.

9. A method in accordance with claim 1, further comprising:
processing voice features of a voice sample in accordance with a first configuration corresponding to a first back end voice processor design; and
processing voice features of another voice sample in accordance with a second configuration corresponding to a second back and voice processor design, the configuring comprising changing from the first configuration to the second configuration.

10. A digital signal processor (DSP) for operating within a voice recognition system and programmed to perform functions of a front end voice processor, the digital signal processor comprising:
a plurality of programmable blocks for performing the functions of the front end voice processor, each of the plurality of programmable blocks having at least one adjustable parameter providing a mechanism for configuring the front end voice processor to one of a plurality of configurations, each configuration governing a processing of voice features in accordance with at least one back end voice processor design for recognixing speech based on the voice features.

11. A digital signal processor in accordance with claim 10, wherein the configuring comprises configuring the front end voice processor in accordance with a configuration file.

12. A digital signal processor in accordance with claim 11, wherein the configuration file is received through a communication link.

13. A digital signal processor in accordance with claim 12, wherein the communication link is a wireless communication link.

14. A digital signal processor in accordance with claim 10, wherein at least one block of the plurality of programmable blocks is selected from the group consisting of:
a DC blocking filter block, a noise suppression block, a FIR filtering on waveform block, a pre-emphasis block, a band energy computation block, a critical band partition block, a critical band weighting block, a FIR filtering of spectrum block, an IIR filtering of log spectrum block, a DCT/PCT/ICT/LDA block, and a combining block.

15. A voice recognition system comprising:
a front end voice processor comprising a plurality of programmable blocks for performing voice processing functions, each of the plurality of programmable blocks having at least one adjustable parameter providing a mechanism for configuring the front end voice processor to one of a plurality of configurations, each configuration governing processing of voice features in accordance with at least one back end voice processor design for recognizing speech based on the voice features; and
a current back end voice processor for recognizing words from processed voice features received from the front end voice processor, the processed voice feature processed in accordance with a configuration file corresponding to the current back end voice processor.

16. A voice recognition system in accordance with claim 15, wherein the configuration file is received through a communication link between the front end voice processor and the current back end voice processor.

17. A voice recognition system in accordance with claim 16, wherein the communication link is a wireless communication link.

18. A voice recognition system in accordance with claim 17, wherein at least one block of the plurality of programmable blocks is selected in the group consisting of:
a DC blocking filter block, a noise suppression block, a FIR filtering on waveform block, a pre-emphasis block, a band energy computation block, a critical band partition block, a critical band weighting block, a FIR filtering of spectrum block, an IIR filtering of log spectrum block, a DCT/PCT/ICT/LDA block, and a combining block.

19. A method performed in a voice recognition system, the method comprising:
determining a design of a current back end voice processor in communication with a front end voice processor configurable to processes voice features in accordance with a plurality of configurations, each configuration governing a processing of voice features in accordance with at least one back end voice processor design for recognizing speech based on the voice features; and
configuring the front end voice processor in accordance with a configuration file corresponding to a design of the current back end voice processor.

20. A method in accordance with claim 19, wherein the determining the design of the current back end voice processor comprises receiving the configuration file through a communication link between the current back end processor and the front end processor.

21. A method in accordance with claim 20, wherein the communication link is a wireless communication link.

22. A method in accordance with claim 19, wherein the configuring comprises:
adjusting at least one adjustable parameter of at least one block of a plurality of blocks comprising the front end voice processor.

23. A method in accordance with claim 22, wherein at least one block of the plurality of programmable blocks is selected from the group consisting of:
a DC blocking filter block, a noise suppression block, a FIR filtering on waveform block, a pre-emphasis block, a band energy computation block, a critical band partition block, a critical band weighting block, a FIR filtering of spectrum block, an IIR filtering of log spectrum block, a DCT/PCT/ICT/LDA block, and a combining block.

* * * * *

UNITED STATES PATENT AND TRADEMARK OFFICE
CERTIFICATE OF CORRECTION

PATENT NO. : 6,941,265 B2
DATED : September 6, 2005
INVENTOR(S) : Ning Bi et al.

It is certified that error appears in the above-identified patent and that said Letters Patent is hereby corrected as shown below:

<u>Title page,</u>
Item [74], *Attorney, Agent, or Firm*, please change "Poppas" to -- Pappas --.

Signed and Sealed this

Twenty-ninth Day of November, 2005

JON W. DUDAS
*Director of the United States Patent and Trademark Office*